United States Patent
Subbareddy et al.

(10) Patent No.: US 11,368,158 B2
(45) Date of Patent: Jun. 21, 2022

(54) METHODS FOR HANDLING INTEGRATED CIRCUIT DIES WITH DEFECTS

(71) Applicant: Intel Corporation, Santa Clara, CA (US)

(72) Inventors: Dheeraj Subbareddy, Portland, OR (US); Ankireddy Nalamalpu, Portland, OR (US); Mahesh A. Iyer, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 849 days.

(21) Appl. No.: 16/019,297

(22) Filed: Jun. 26, 2018

(65) Prior Publication Data

US 2019/0044518 A1    Feb. 7, 2019

(51) Int. Cl.

| | |
|---|---|
| *H03K 19/17764* | (2020.01) |
| *H03K 19/17724* | (2020.01) |
| *H03K 19/17736* | (2020.01) |
| *G06F 30/30* | (2020.01) |
| *G06F 30/39* | (2020.01) |
| *G06F 117/06* | (2020.01) |

(52) U.S. Cl.
CPC ....... *H03K 19/17764* (2013.01); *G06F 30/30* (2020.01); *G06F 30/39* (2020.01); *H03K 19/17724* (2013.01); *H03K 19/17744* (2013.01); *G06F 2117/06* (2020.01)

(58) Field of Classification Search
CPC ....... H03K 19/17764; H03K 19/17724; H03K 19/17744; G06F 30/30; G06F 30/39; G06F 2117/06

USPC ...................................... 326/38–41
See application file for complete search history.

(56) References Cited

U.S. PATENT DOCUMENTS

| | | | |
|---|---|---|---|
| 6,148,390 A | 11/2000 | McArthur et al. | |
| 6,201,404 B1 | 3/2001 | Reddy et al. | |
| 6,344,755 B1 | 2/2002 | Reddy et al. | |
| 6,507,933 B1 * | 1/2003 | Kirsch | H01L 22/20 257/E21.525 |
| 6,779,258 B2 | 8/2004 | Prindiville et al. | |
| 6,891,108 B2 | 5/2005 | Prindiville et al. | |
| 6,922,482 B1 * | 7/2005 | Ben-Porath | G06K 9/6268 382/149 |
| 6,965,249 B2 | 11/2005 | Lane et al. | |
| 7,180,324 B2 | 2/2007 | Chan et al. | |
| 7,187,383 B2 | 3/2007 | Kent | |
| 7,215,140 B1 | 5/2007 | Saini et al. | |

(Continued)

*Primary Examiner* — Don P Le

(57) ABSTRACT

A method of handling integrated circuit dies with defects is provided. After forming a plurality of dies on one or more silicon wafers, test equipment may be used to identify defects on the dies and to create corresponding defect maps. The defect maps can be combined to form an aggregate defect map. Circuit design tools may create keep-out zones from the aggregate defect map and run learning experiments on each die, while respecting the keep-out zones, to compute design metrics. The circuit design tools may further create larger keep-out zones and run additional learning experiments on each die while respecting the larger keep-out zones to compute additional design metrics. The dies can be binned into different Stock Keeping Units (SKUs) based on one or more of the computed design metrics. Circuit design tools automatically respect the keep-out regions for these dies to program them correctly in the field.

20 Claims, 10 Drawing Sheets

(56) References Cited

U.S. PATENT DOCUMENTS

| | | | | |
|---|---|---|---|---|
| 7,229,845 | B1* | 6/2007 | Luu | G06Q 50/04 |
| | | | | 257/E21.525 |
| 7,284,229 | B1 | 10/2007 | Frimberger | |
| 7,412,635 | B1 | 8/2008 | Frimberger | |
| 7,622,952 | B1 | 11/2009 | Lim et al. | |
| 7,644,386 | B1 | 1/2010 | Chan et al. | |
| 8,174,284 | B1 | 5/2012 | Lewis | |
| 8,191,025 | B1 | 5/2012 | Chan et al. | |
| 8,362,800 | B2 | 1/2013 | Or-Bach et al. | |
| 9,372,956 | B1* | 6/2016 | Fan | G06F 30/398 |
| 10,145,894 | B1* | 12/2018 | Tangyunyong | G01R 31/31721 |
| 10,867,108 | B2* | 12/2020 | Chao | G03F 7/70616 |
| 10,902,576 | B2* | 1/2021 | Trumbauer | G06T 7/0004 |
| 2002/0143483 | A1* | 10/2002 | Ono | H01L 21/67288 |
| | | | | 702/83 |
| 2006/0053357 | A1* | 3/2006 | Rajski | G01R 31/2846 |
| | | | | 714/742 |
| 2009/0206868 | A1* | 8/2009 | Laisne | G01R 31/3008 |
| | | | | 324/754.21 |
| 2013/0227342 | A1* | 8/2013 | Shepherd | G11C 29/4401 |
| | | | | 714/6.13 |
| 2014/0157213 | A1* | 6/2014 | Hsieh | G03F 1/36 |
| | | | | 716/52 |
| 2014/0270475 | A1* | 9/2014 | Huang | G06T 7/001 |
| | | | | 382/149 |
| 2019/0044518 | A1* | 2/2019 | Subbareddy | G06F 30/30 |
| 2021/0116817 | A1* | 4/2021 | Verduijn | G03F 7/0045 |

\* cited by examiner

METHODS FOR HANDLING INTEGRATED CIRCUIT DIES WITH DEFECTS

BACKGROUND

This relates to integrated circuits, and more particularly, to programmable integrated circuits.

Programmable integrated circuits contain programmable logic that may be programmed to implement a desired custom logic design and are therefore sometimes referred to as programmable logic devices (PLDs). Programmable logic devices are typically very large integrated circuit dies with hundreds of millions of transistors formed on a silicon substrate. During the early phases of a production ramp of a new process technology node, there may be a large number of defects on a silicon die, which can substantially reduce the yield of good dies. Conventionally, an integrated circuit die must be fully functional and completely free of defects before it can be shipped to a customer.

Existing techniques for handling silicon defects involve the use of redundant circuitry. Redundant circuitry can be used to repair a programmable logic device that contains a defect, thereby improving production yield. As an example, a programmable logic device is typically organized into logic regions. Each of the logic regions on a programmable logic device includes multiple rows of logic and one spare row of logic. When one row in a logic region is determined to be defective (assuming the bad row is not the spare row), the redundant row is switched into use to effectively replace the defective row (i.e., so that each spare row immediately below the bad row replaces the row immediately preceding that row).

Implementing defect resiliency via redundant circuitry in this way limits the usability and can incur cost penalties in terms of die-bridging technologies. Moreover, any defects that are not covered by the repair/redundancy scheme will render the die unusable. In leading-edge process technology nodes, silicon defect is relatively pronounced, which results in much fewer fully-functional dies.

It is within this context that the embodiments described herein arise.

DETAILED DESCRIPTION

The present embodiments relate to methods for handling programmable integrated circuits with defects. Production/wafer-level testing may be performed on a group of integrated circuit dies to generate a defect map for each integrated circuit die. Defect maps generated in this way can be fed to an integrated circuit design tool, which then runs a series of experiments on the group of dies while avoiding usage of logic resources in accordance with the defect maps. The integrated circuit design tool can determine the exact shape of the blocked-off regions (sometimes referred to herein as "keep-out zones") based on the defect maps.

The experiments will produce design metrics such as the logic utilization, performance, routability/congestion, and compile time for each die which cannot be repaired to full functionality. These irreparable dies can then be binned into one or more different Stock Keeping Units (SKUs) based on the design metrics. To help with binning, the integrated circuit design tool may generate larger keep-out zones that cover defective resources in multiple dies. Maintaining uniform shapes of keep-out zones can also help increase the predictability of binning results.

The different SKUs generated in this way can then be sold as parts that have lower logic density and/or performance to customers who do not require the full logic usability and performance offered only by fully-functional dies (i.e., to customers who can tolerate the reduced logic utilization and performance). This will enable the die manufacturer to sell substantially more of all printed dies from a single wafer (i.e., to sell parts which are traditionally scrapped due to one or more irreparable defects). As an example, chip makers may be able to increase percentage of the sellable dies per wafer from 54% to 100% (i.e., by monetizing 46% of the wafer that was previously scrapped), which delivers a non-linear increase in revenue at lower product cost.

It will be recognized by one skilled in the art, that the present exemplary embodiments may be practiced without some or all of these specific details. In other instances, well-known operations have not been described in detail in order not to unnecessarily obscure the present embodiments.

Figure 1:
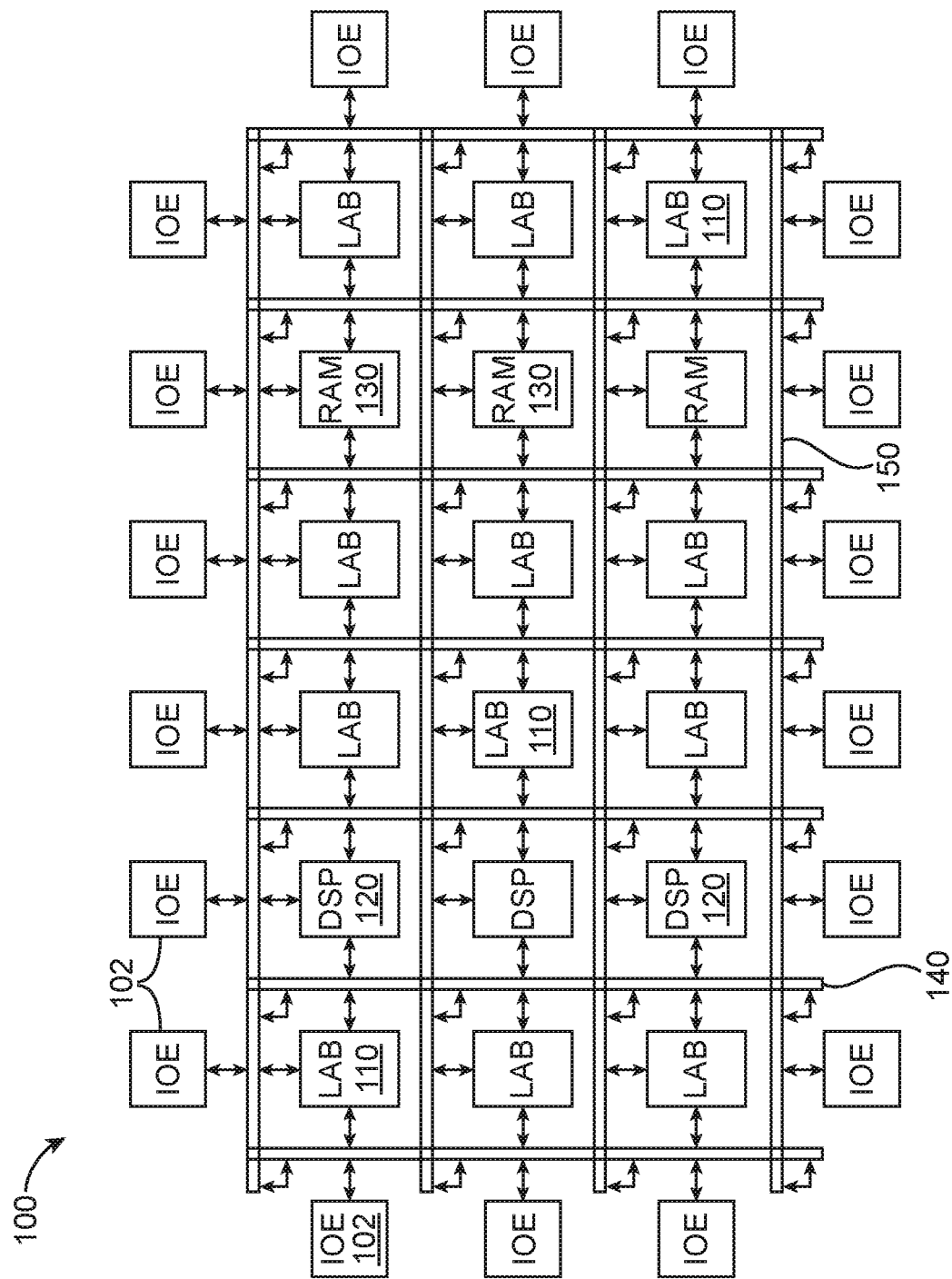
FIG. 1 is a diagram of an illustrative programmable integrated circuit in accordance with an embodiment.

An illustrative embodiment of a programmable integrated circuit such as programmable logic device (PLD) 100 that may be configured to implement a circuit design is shown in FIG. 1. As shown in FIG. 1, the programmable logic device (PLD) may include a two-dimensional array of functional blocks, including logic array blocks (LABs) 110 and other functional blocks, such as random access memory (RAM) blocks 130 and digital signal processing (DSP) blocks 120, for example. Functional blocks such as LABs 110 may include smaller programmable regions (e.g., logic elements, configurable logic blocks, or adaptive logic modules) that receive input signals and perform custom functions on the input signals to produce output signals. LABs 110 may also be grouped into larger programmable regions sometimes referred to as logic sectors that are individually managed and configured by corresponding logic sector managers. The grouping of the programmable logic resources on device 100 into logic sectors, logic array blocks, logic elements, or adaptive logic modules is merely illustrative. In general, device 100 may include functional logic blocks of any suitable size and type, which may be organized in accordance with any suitable logic resource hierarchy.

Programmable logic device 100 may contain programmable memory elements. Memory elements may be loaded with configuration data (also called programming data) using input-output elements (IOEs) 102. Once loaded, the memory elements each provide a corresponding static control signal that controls the operation of an associated functional block (e.g., LABs 110, DSP 120, RAM 130, or input-output elements 102).

In a typical scenario, the outputs of the loaded memory elements are applied to the gates of metal-oxide-semiconductor transistors in a functional block to turn certain transistors on or off and thereby configure the logic in the functional block including the routing paths. Programmable logic circuit elements that may be controlled in this way include parts of multiplexers (e.g., multiplexers used for forming routing paths in interconnect circuits), look-up tables, logic arrays, AND, OR, NAND, and NOR logic gates, pass gates, etc.

The memory elements may use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory, configuration random-access memory (CRAM), or programmable memory elements. Programmable logic device (PLD) 100 may be configured to implement a custom circuit design. For example, the configuration RAM may be programmed such that LABs 110, DSP 120, and RAM 130, programmable interconnect circuitry (i.e., vertical channels 140 and horizontal channels 150), and the input-output elements 102 form the circuit design implementation.

In addition, the programmable logic device may have input-output elements (IOEs) 102 for driving signals off of PLD 100 and for receiving signals from other devices. Input-output elements 102 may include parallel input-output circuitry, serial data transceiver circuitry, differential receiver and transmitter circuitry, or other circuitry used to connect one integrated circuit to another integrated circuit.

The PLD may also include programmable interconnect circuitry in the form of vertical routing channels 140 (i.e., interconnects formed along a vertical axis of PLD 100) and horizontal routing channels 150 (i.e., interconnects formed along a horizontal axis of PLD 100), each routing channel including at least one track to route at least one wire. If desired, the interconnect circuitry may include pipeline elements, and the contents stored in these pipeline elements may be accessed during operation. For example, a programming circuit may provide read and write access to a pipeline element.

Note that other routing topologies, besides the topology of the interconnect circuitry depicted in FIG. 1, are intended to be included within the scope of the present invention. For example, the routing topology may include wires that travel diagonally or that travel horizontally and vertically along different parts of their extent as well as wires that are perpendicular to the device plane in the case of three dimensional integrated circuits, and the driver of a wire may be located at a different point than one end of a wire. The routing topology may include global wires that span substantially all of PLD 100, fractional global wires such as wires that span part of PLD 100, staggered wires of a particular length, smaller local wires, or any other suitable interconnection resource arrangement.

Figure 2:
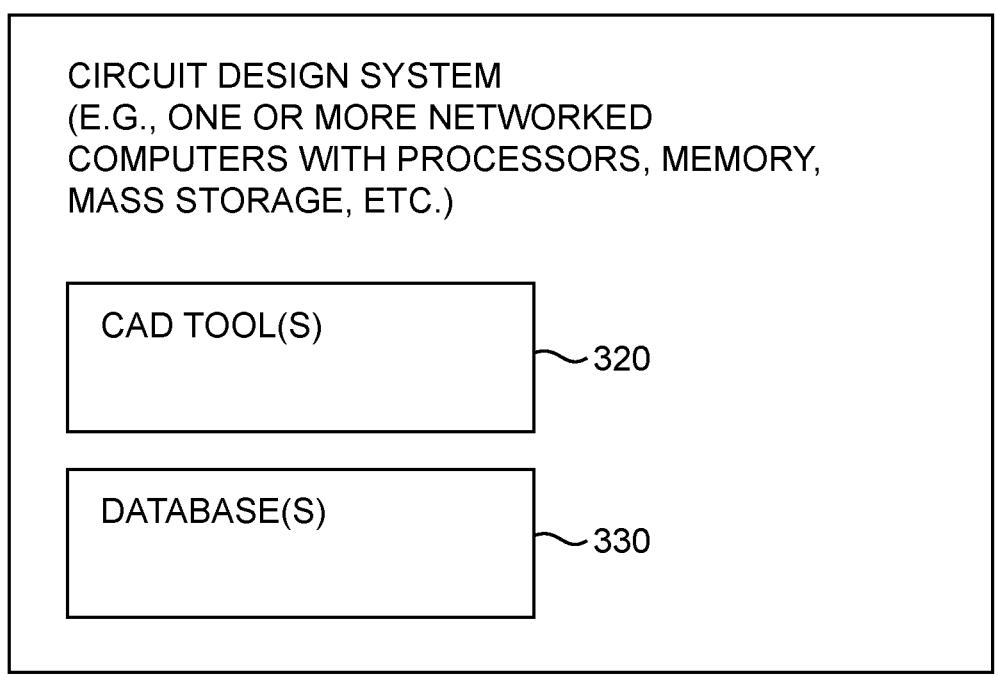
FIG. 2 is a diagram of a circuit design system that may be used to design integrated circuits in accordance with an embodiment.

An illustrative circuit design system 300 that can be used to design programmable device 100 is shown in FIG. 2. Circuit design system 300 may be implemented on integrated circuit design computing equipment. For example, system 300 may be based on one or more processors such as personal computers, workstations, etc. The processor(s) may be linked using a network (e.g., a local or wide area network). Memory in these computers or external memory and storage devices such as internal and/or external hard disks may be used to store instructions and data.

Software-based components such as computer-aided design tools 320 and databases 330 reside on system 300. During operation, executable software such as the software of computer aided design tools 320 runs on the processor(s) of system 300. Databases 330 are used to store data for the operation of system 300. In general, software and data may be stored on non-transitory computer readable storage media (e.g., tangible computer readable storage media). The software code may sometimes be referred to as software, data, program instructions, instructions, scripts, or code. The non-transitory computer readable storage media may include computer memory chips such as read-only memory (ROM), non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, floppy diskettes, tapes, or any other suitable memory or storage device(s).

Software stored on the non-transitory computer readable storage media may be executed on system 300. When the software of system 300 is installed, the storage of system 300 has instructions and data that cause the computing equipment in system 300 to execute various methods or processes. When performing these processes, the computing equipment is configured to implement the functions of circuit design system 300.

Computer aided design (CAD) tools 320, some or all of which are sometimes referred to collectively as a CAD tool, a circuit design tool, or an electronic design automation (EDA) tool, may be provided by a single vendor or by multiple vendors. Tools 320 may be provided as one or more suites of tools (e.g., a compiler suite for performing tasks associated with implementing a circuit design in a programmable logic device) and/or as one or more separate software components (tools). Database(s) 330 may include one or more databases that are accessed only by a particular tool or tools and may include one or more shared databases. Shared databases may be accessed by multiple tools. For example, a first tool may store data for a second tool in a shared database. The second tool may access the shared database to retrieve the data stored by the first tool. This allows one tool to pass information to another tool. Tools may also pass information between each other without storing information in a shared database if desired.

Figure 3:
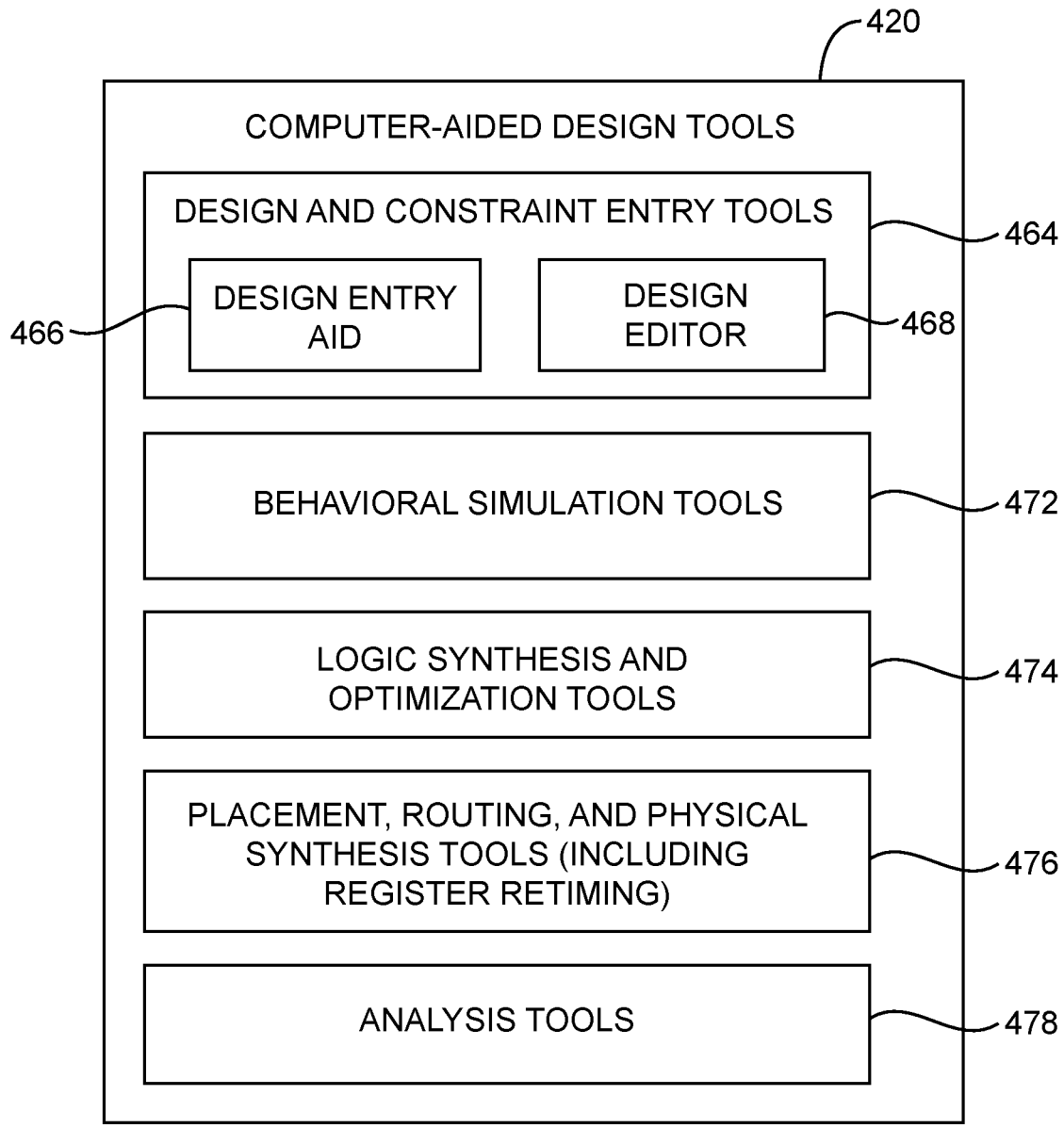
FIG. 3 is a diagram of illustrative computer-aided design (CAD) tools that may be used in a circuit design system in accordance with an embodiment.

Illustrative computer aided design tools 420 that may be used in a circuit design system such as circuit design system 300 of FIG. 2 are shown in FIG. 3. CAD tools 420 of FIG. 3 may be similar or equivalent to CAD tools 320 of FIG. 2.

The design process may start with the formulation of functional specifications of the integrated circuit design (e.g., a functional or behavioral description of the integrated circuit design). A circuit designer may specify the functional operation of a desired circuit design using design and constraint entry tools 464. Design and constraint entry tools 464 may include tools such as design and constraint entry aid 466 and design editor 468. Design and constraint entry aids such as aid 466 may be used to help a circuit designer locate a desired design from a library of existing circuit designs and may provide computer-aided assistance to the circuit designer for entering (specifying) the desired circuit design.

As an example, design and constraint entry aid 466 may be used to present screens of options for a user. The user may click on on-screen options to select whether the circuit being designed should have certain features. Design editor 468 may be used to enter a design (e.g., by entering lines of hardware description language code), may be used to edit a design obtained from a library (e.g., using a design and constraint entry aid), or may assist a user in selecting and editing appropriate prepackaged code/designs.

Design and constraint entry tools 464 may be used to allow a circuit designer to provide a desired circuit design using any suitable format. For example, design and constraint entry tools 464 may include tools that allow the circuit designer to enter a circuit design using truth tables. Truth tables may be specified using text files or timing diagrams and may be imported from a library. Truth table circuit design and constraint entry may be used for a portion of a large circuit or for an entire circuit.

As another example, design and constraint entry tools 464 may include a schematic capture tool. A schematic capture tool may allow the circuit designer to visually construct integrated circuit designs from constituent parts such as logic gates and groups of logic gates. Libraries of preexisting integrated circuit designs may be used to allow a desired portion of a design to be imported with the schematic capture tools.

If desired, design and constraint entry tools 464 may allow the circuit designer to provide a circuit design software application code to the circuit design system 300 using a hardware description language such as Verilog hardware description language (Verilog HDL), Very High Speed Integrated Circuit Hardware Description Language (VHDL), SystemVerilog, or a higher-level circuit description language such as OpenCL, SystemC, C/C++, just to name a few. The designer of the integrated circuit design can enter the circuit design by writing the application code with editor 468. Blocks of code may be imported from user-maintained or commercial libraries if desired.

After the design has been entered using design and constraint entry tools 464, behavioral simulation tools 472 may be used to simulate the functionality of the circuit design. If the functionality of the design is incomplete or incorrect, the circuit designer can make changes to the circuit design using design and constraint entry tools 464. The functional operation of the new circuit design may be verified using behavioral simulation tools 472 before synthesis operations have been performed using tools 474. Simulation tools such as behavioral simulation tools 472 may also be used at other stages in the design flow if desired (e.g., after logic synthesis). The output of the behavioral simulation tools 472 may be provided to the circuit designer in any suitable format (e.g., truth tables, timing diagrams, etc.).

Once the functional operation of the circuit design has been determined to be satisfactory, logic synthesis and optimization tools 474 may generate a gate-level netlist of the circuit design, for example using gates from a particular library pertaining to a targeted process supported by a foundry, which has been selected to produce the integrated circuit. Alternatively, logic synthesis and optimization tools 474 may generate a gate-level netlist of the circuit design using gates of a targeted programmable logic device (i.e., in the logic and interconnect resources of a particular programmable logic device product or product family).

Logic synthesis and optimization tools 474 may optimize the design by making appropriate selections of hardware to implement different logic functions in the circuit design based on the circuit design data and constraint data entered by the logic designer using tools 464. As an example, logic synthesis and optimization tools 474 may perform multi-level logic optimization and technology mapping based on the length of a combinational path between registers in the circuit design and corresponding timing constraints that were entered by the logic designer using tools 464.

After logic synthesis and optimization using tools 474, the circuit design system may use tools such as placement, routing, and physical synthesis tools 476 to perform physical design steps (layout synthesis operations). Tools 476 can be used to determine where to place each gate of the gate-level netlist produced by tools 474. For example, if two counters interact with each other, tools 476 may locate these counters in adjacent regions to reduce interconnect delays or to satisfy timing requirements specifying the maximum permitted interconnect delay. Tools 476 create orderly and efficient implementations of circuit designs for any targeted integrated circuit (e.g., for a given programmable integrated circuit such as a field-programmable gate array (FPGA)).

Tools such as tools 474 and 476 may be part of a compiler suite (e.g., part of a suite of compiler tools provided by a programmable logic device vendor). In certain embodiments, tools such as tools 474, 476, and 478 may also include timing analysis tools such as timing estimators. This allows tools 474 and 476 to satisfy performance requirements (e.g., timing requirements) before actually producing the integrated circuit.

After an implementation of the desired circuit design has been generated using tools 476, the implementation of the design may be analyzed and tested using analysis tools 478. For example, analysis tools 478 may include timing analysis tools, power analysis tools, or formal verification tools, just to name few.

After satisfactory optimization operations have been completed using tools 420 and depending on the targeted integrated circuit technology, tools 420 may produce a mask-level layout description of the integrated circuit or configuration data for programming the programmable logic device.

Figure 4:
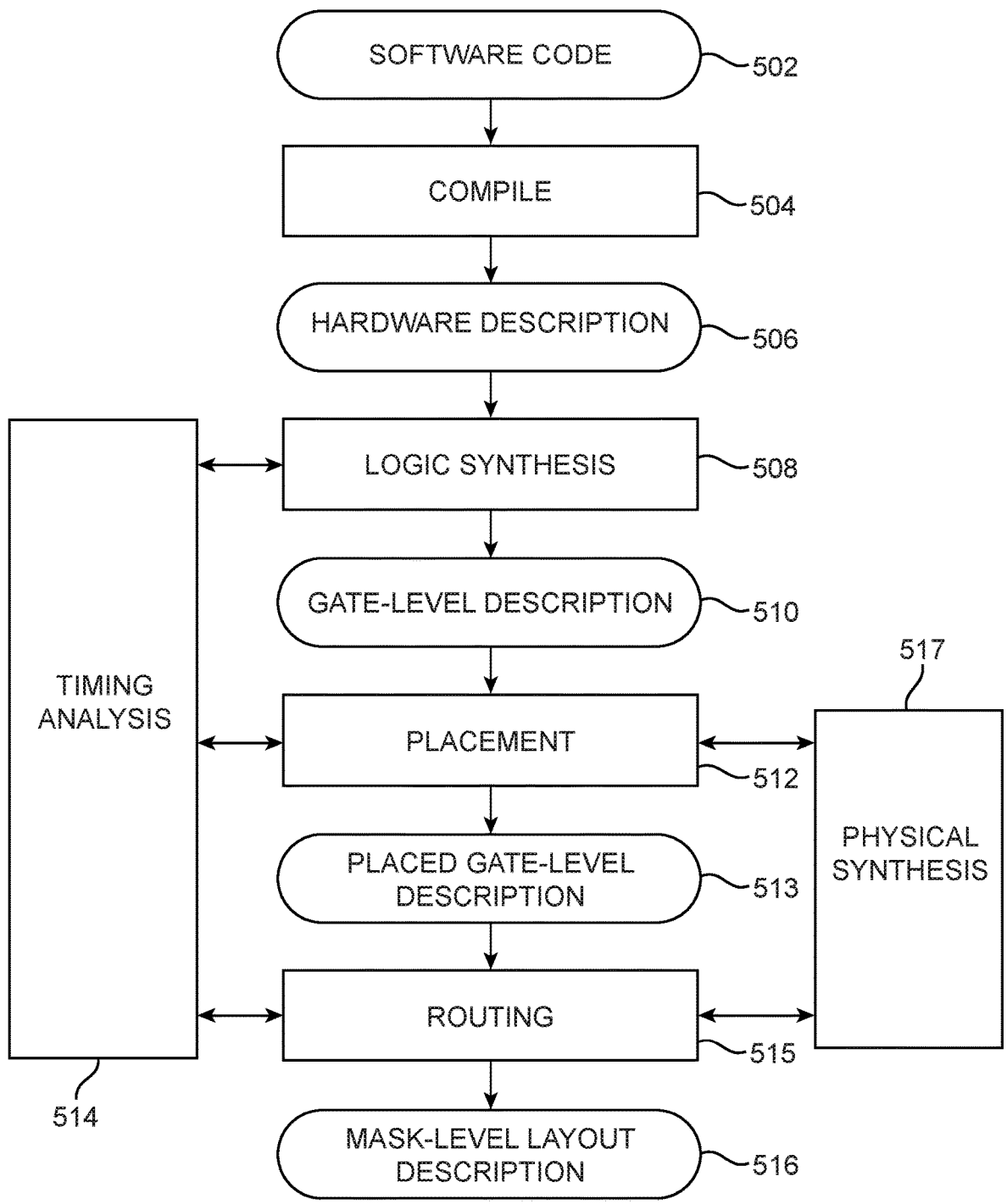
FIG. 4 is a flow chart of illustrative steps for designing an integrated circuit in accordance with an embodiment.

Illustrative operations involved in using tools 420 of FIG. 3 to produce the mask-level layout description of the integrated circuit are shown in FIG. 4. A circuit designer may first provide a design specification. The design specification may, in general, be a behavioral description provided in the form of a software application source code 502 (e.g., C code, C++ code, SystemC code, OpenCL code, etc.).

At step 504, tools 420 may compile source code 502 via a process sometimes referred to as behavioral synthesis or algorithmic synthesis to convert code 502 into a hardware description 506. Hardware description 506 may (as an example) be a register transfer level (RTL) description. The RTL description may have any form of describing circuit functions at the register transfer level. For example, the RTL description may be expressed using a hardware description language such as the Verilog hardware description language (Verilog HDL or Verilog), the SystemVerilog hardware description language (SystemVerilog HDL or SystemVerilog), or the Very High Speed Integrated Circuit Hardware Description Language (VHDL).

In general, code 502 may include untimed or partially timed functional code (i.e., the application code does not describe cycle-by-cycle hardware behavior), whereas the hardware description 506 may include a fully timed design description that details the cycle-by-cycle behavior of the circuit at the register transfer level.

Code 502 and/or hardware description 506 may also include target criteria such as area use, power consumption, delay minimization, clock frequency optimization, or any combination thereof. The optimization and target criteria may be collectively referred to as constraints.

Those constraints can be provided for individual data paths, portions of individual data paths, portions of a design, or for the entire design. For example, the constraints may be provided with code 502, description 506, in a constraint file, or through user input (e.g., using the design and constraint entry tools 464 of FIG. 3), to name a few.

During step 508, logic synthesis operations may generate gate-level description 510 from hardware description 506 using logic synthesis and optimization tools 474 (FIG. 3). The output of logic synthesis 508 is a gate-level description 510 of the design.

During step 512, placement operations using placement tools 476 of FIG. 3 may place the different gates in gate-level description 510 in a preferred location on the targeted integrated circuit to meet given target placement criteria (e.g., to minimize area and maximize routing efficiency or minimize path delay and maximize clock frequency or minimize overlap between logic elements, or any combination thereof). The output of placement 512 is a placed gate-level description 513, which satisfies the legal placement constraints of the underlying target device.

During step 515, routing operations using for example routing tools 476 of FIG. 3 may connect the gates from the placed gate-level description 513. Routing operations may attempt to meet given target routing criteria (e.g., to minimize congestion, minimize path delay and maximize clock frequency, satisfy minimum delay requirements, or any combination thereof). Steps 512 and 515 are sometimes referred to collectively as a circuit "fitting" operation. The output of routing 515 is a mask-level layout description 516 (sometimes referred to as routed gate-level description 516).

While placement and routing are being performed at steps 512 and 515, physical synthesis operations 517 may be concurrently performed to further modify and optimize the circuit design (e.g., using physical synthesis tools 476 of FIG. 3).

Integrated circuit design tools 420 of the type described in connection with FIG. 3, which can be used to perform the operations of FIG. 4, are typically used to input a source code and to generate a corresponding configuration bitstream for loading into a target programmable logic device 100 to implement a custom logic design defined by the user's source code. In addition to users/customers using tools 420 to compile and synthesize their designs in the field, integrated circuit design tools 420 may also be used in the chipmaker's factory to perform experiments or simulations to evaluate the potential usability and performance of each manufactured integrated circuit die.

Figure 5:
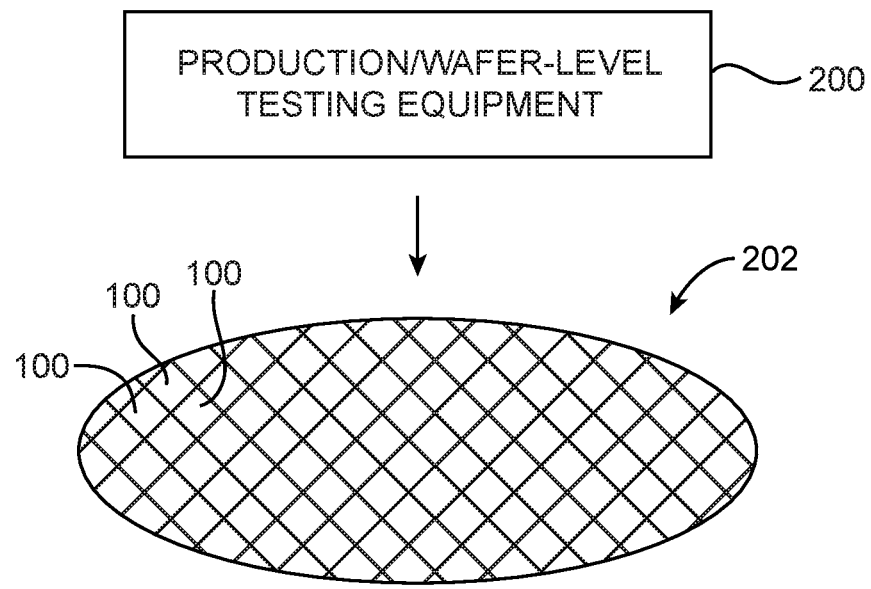
FIG. 5 is a diagram of an illustrative silicon wafer that can be evaluated for defects using production/wafer-level testing equipment in accordance with an embodiment.

FIG. 5 is a diagram of an illustrative silicon wafer such as wafer 202 that includes an array of integrated circuit devices 100 (e.g., an array of programmable logic devices 100). Integrated circuits 100 may be formed on silicon wafer 202 via a series of microfabrication processing steps, which can include doping or ion implantation, etching, deposition of various materials, photolithography patterning operations, etc. Once devices 100 have been fabricated, wafer 202 may be singulated or diced into individual integrated circuit dies 100, each of which can then be encased within an integrated circuit package.

In leading-edge processing technology nodes, silicon defects are relatively pronounced and can result in much fewer fully-functional dies. As shown in FIG. 5, production testing equipment such as equipment 200 may perform wafer-level testing on wafer 202 before dicing. If desired, the testing may also be performed after wafer 202 has been diced into individual parts. Test equipment 200 may be used to test all devices 100 on wafer 202 for any functional defects. A defect may be defined as any behavior that does not match the intended functionality. Test equipment 200 may be a wafer prober (as an example) and may be used to perform fault analysis, fault isolation, electronic die sorting (EDS), circuit probing, etc.

Figure 6:
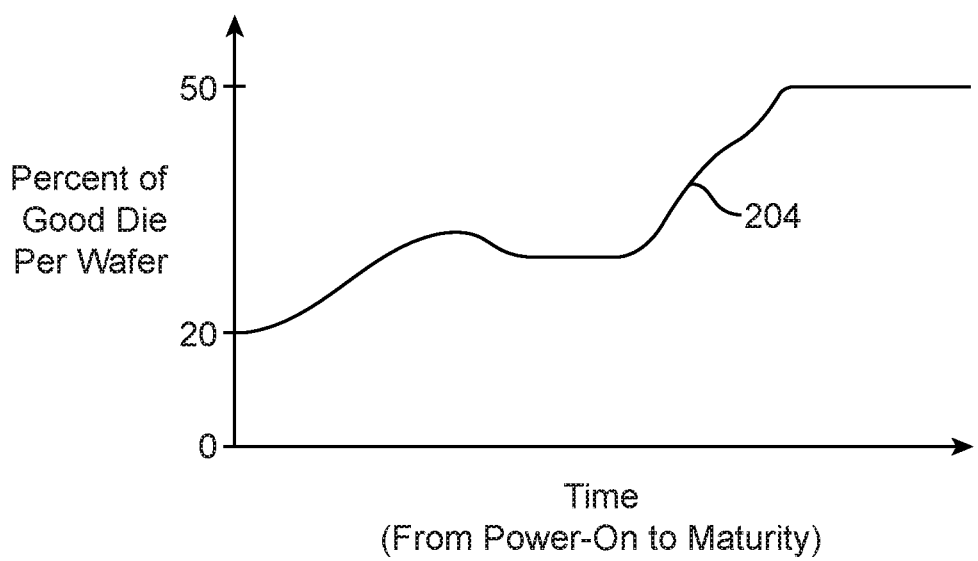
FIG. 6 is a diagram plotting the number of good dies per wafer throughout a production phase in accordance with an embodiment.

FIG. 6 is a diagram plotting the amount of good dies per wafer throughout a process ramp phase (sometimes also referred to as a production ramp-up phase). As shown by trace 204 in FIG. 6, the percentage of good dies on a wafer can be as low as 20% at initial power-on, indicating a large number of defects on the silicon at the early stages of the process ramp phase. In this illustration, a die is considered to be "good" if it is fully functional or repairable via a hardware redundancy scheme such as by switching into use a redundant LAB row to replace a defective LAB row.

Over time as the technology process matures, the amount of good dies per wafer will generally increase. In the example of FIG. 6 (that is merely illustrative), the percentage of good dies on the wafer may cap out to only around 50% at full process maturity. In other words, about 50% of the remaining dies on the wafer are non-monetizable and will have to be scrapped. The yield per wafer decreases at more advanced technology nodes since defect densities worsen as chip manufacturers transition to lower geometry technology nodes.

In accordance with an embodiment, a method for providing partially defective dies (or parts) to customers/users will be described below. The defective portion of the die will be masked out, which is completely hidden from the user's point of view, thus providing a seamless experience for the customers. Configured in this way, integrated circuit design tools 420 will not be able to use or access the defective regions on the die. This capability enables PLD vendors to monetize a large portion of the previously scrapped parts by creating additional Stock Keeping Units (SKUs) that have fewer usable logic resources.

This can benefit both early and later stages of the production ramp. Early on in the process ramp, the PLD vendor can provide parts with defects to customers whose designs be placed and routed on parts with defects (e.g., customer designs will oftentimes have lower requirements early on in their design phase). Aligning the chip manufacturer's process ramp phase with the customer's design phase enables more cost-effective customer design development while realizing more revenue early on in the process ramp cycle. This can help customers dramatically shorten the design phase and allow them to create improved integrated circuit designs within a shorter amount of time. Having a wider range of SKUs with varying levels of logic utilization and performance specifications can also help maximize revenue for the semiconductor chip manufacturer as the process ramps up. This capability of creating multiple SKUs throughout the process ramp phase is only possible due to the programmable and modular nature of device 100 since the defective resources can be easily blocked off without affecting the functionality of the target user design.

Figure 7:
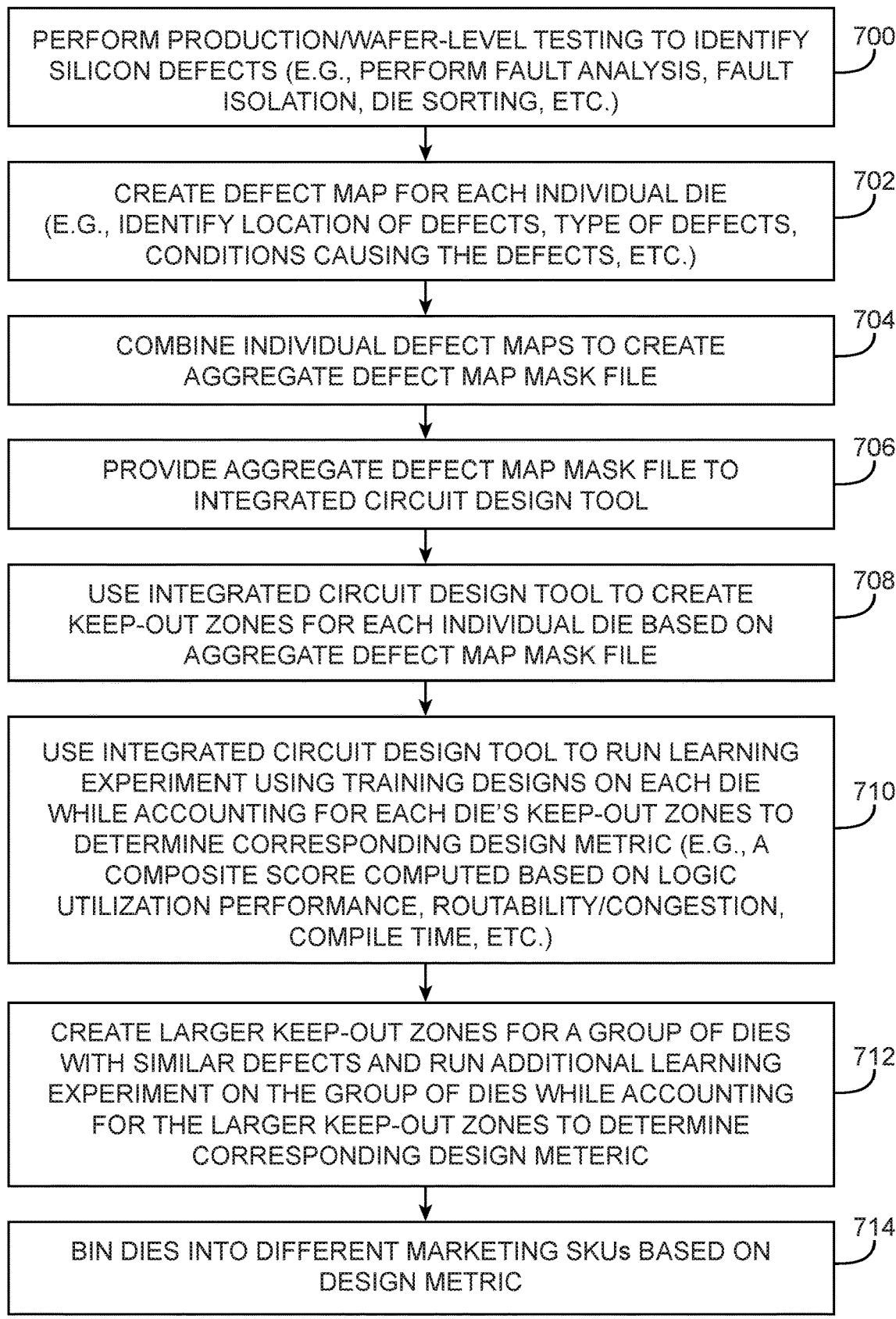
FIG. 7 is a flow chart of illustrative steps for generating defect maps for a plurality of integrated circuit dies and binning the integrated circuit dies using the defect maps in accordance with an embodiment.

The generation of multiple SKUs throughout the process ramp phase may involve obtaining defect maps for the integrated circuit dies from one or more wafers and then binning them in accordance with some design metric. FIG. 7 is a flow chart of illustrative steps that can be performed at the chipmaker's factory for generating defect maps for a plurality of integrated circuit dies and binning the integrated circuit dies using the defect maps. At step 700, test equipment 200 (FIG. 5) may be used to perform production/wafer-level testing on wafer 202 to identify silicon defects. As examples, tester 200 may be operated to perform fault analysis, fault isolation, die sorting, and/or other factory-level assessment to gather test data.

Figure 8:
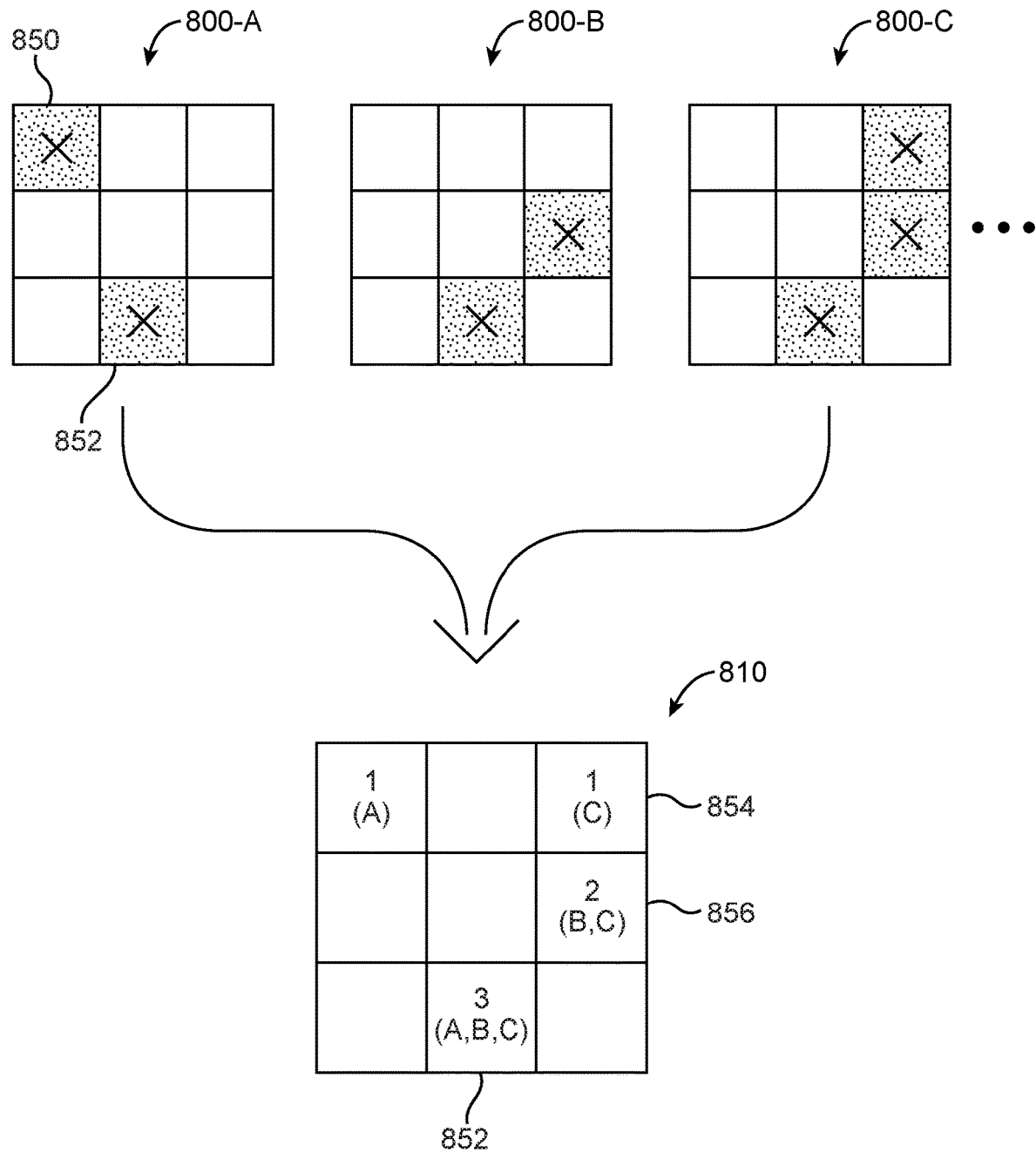
FIG. 8 is a diagram showing how multiple defect maps can be combined to form an aggregated defect map in accordance with an embodiment.

At step 702, the gathered test data can be used to create a defect map for each individual die. FIG. 8 shows three exemplary defect maps: a first defect map 800-A associated with a first integrated circuit (IC) die A, a second defect map 800-B associated with a second IC die B, and a third defect map 800-C associated with a third IC die C. Each defect map 800 may be represented as a grid of logic resources of any desired granularity. A defect map with a very fine level of granularity may identify defects at the transistor level, at the logic gate level, or at the multiplexer level (as examples) and may therefore produce in a grid with many entries. In general, defect maps should not be of very fine granularity to avoid an exponential increase of cases for which the design tool must run experiments on at step 710. A defect map with a coarse level of granularity may identify defects at the logic sector level or at the LAB level (as examples) and may therefore produce a grid with relatively fewer entries. If desired, defect map 800 may also have any suitable intermediate levels of granularity.

Defect map 800 may identify the location of defects. Consider, as an example, defect map 800-A that includes a 3-by-3 array of logic regions. In the example of FIG. 8, the "X" marks the physical location of defects for each particular die. For example, the fault analysis and fault isolation testing performed at step 700 may provide the exact bit location or row/column information corresponding to the failing resource(s). This example in which the logic resources of each IC die is organized into a 3-by-3 grid is merely illustrative. In general, defect map 800 may be a rectangular or non-rectangular grid of any suitable size and granularity.

In addition to indicating the exact location of defects, defect map 800 may also identify the type of defect for each defective region. As shown in FIG. 8, the top-left logic region 850 and the middle-bottom logic region 852 in map 800-A are marked as defective. Map 800-A may further include information indicating that a particular flip-flop, logic gate, routing path, multiplexer, digital signal processing block (e.g., DSP 120 of FIG. 1), block RAM (e.g., RAM 130 of FIG. 1), group of CRAM cells, or other circuit resources on device 100 is defective for logic regions 850 and 852.

Furthermore, defect map 800 may also identify the condition(s) that need to be met to cause the defect in each defective region. As an example, defect map 800 may specify that a particular logic gate in region 850 is defective or non-functional at certain process-voltage-temperature or "PVT" conditions (e.g., at the slow-slow process corner, at low operating voltages, and at elevated operating temperatures). As another example, defect map 800 may specify that a particular DSP block is defective in a high-performance mode but is functional in a low-performance mode (i.e., the presence of defects may be mode-specific). As yet another example, defect map 800 may specify that a particular lookup table (LUT) circuit is defective only when it is coupled to an associated block RAM (i.e., the presence of defects may be connection-specific). These defect-yielding conditions are merely illustrative. In general, defect map 800 can include any suitable type or number of conditions required to cause each defect.

At step 706, the defect map associated with each individual IC die may be combined to create an aggregate defect map, which can be stored as a mask file. Referring again to the example of FIG. 8, the three separate defect maps 800-A, 800-B, and 800-C may be combined to form aggregate defect map 810. Aggregate defect map 810 may show the total number of defects in each logic region in the grid and also where each of the tallied defects is from. For example, aggregate defect map 810 may show how there are three cumulative defects in logic region 852 (e.g., defects from all three dies A, B, and C), how there are two cumulative defects in logic region 856 (e.g., defects from only two dies B and C), and how there is only one cumulative defect in logic region 854 (e.g., defects from only die C). In addition to the location and number of defects at each logic region, aggregate defect map 810 may also include information about the type and condition causing each of the tallied defects.

At step 708, the aggregate defect map mask file may be fed to an integrated circuit design tool (e.g., CAD tools 420 of FIG. 3). The IC design tool may create "keep-out zones" for each die based on the aggregate defect map mask file. The keep-out zones define areas or regions on a particular IC die that are blocked off and are therefore restricted from being utilized to implement any logic function. In one suitable arrangement, all the logic in a defective region is marked as keep-out or restricted. In another suitable arrangement, only a subset of resources in a defective region may be marked as keep-out or restricted. The keep-out zones for each die may at least overlap with the defective regions. Referring again to the example of FIG. 8, the keep-out zones for each of the three dies are shaded.

At step 710, a factory operator may use the IC design tool to run a series of learning experiments using representative test/training designs on each die while accounting for each die's keep-out zones. For example, one or more training circuit designs may be compiled (e.g., step 504 in FIG. 4), synthesized (e.g., step 508 in FIG. 4), and fitted (e.g., placed and routed as in steps 512 and 515 in FIG. 4) on each die while avoiding any usage of the designated keep-out zones if the defect-causing conditions are met. The goal of these learning experiments may be to reduce or minimize the effect of the defective regions on corresponding design metrics while increasing or maximizing the number of defective IC dies that can be shipped to customers and decreasing or minimizing the number of bins and the number of unique keep-out zones in each of the bins.

The IC design tool may produce one or more design metric while conducting the learning experiments. For example, the IC design tool may compute a composite score that is a function of the overall logic utilization on the die (e.g., larger keep-out zones will generally reduce the logic utilization, which can sometimes be represented as the number of available/usable logic elements on the die), the performance or maximum operating frequency of the training design on the die, the power consumption on the die, the routability of interconnected circuits on the die (e.g., the presence of keep-out zones can sometimes lead to higher routing congestion, which would increase the difficulty of the place and route operations), compile time (e.g., awkwardly shaped or non-uniform keep-out zones can sometimes increase compile time), some combination of these metrics, and/or other suitable design metrics. These metrics can optionally be weighted differently in the composite score (i.e., the composite score may be a weighted function of one or more of the design metrics). As an example, logic utilization may be assigned a relatively greater weighting factor than performance. As another example, performance may be assigned a relatively greater weighting factor than routing congestion. In general, any suitable weighting scheme can be used to emphasize or deemphasize one or more of the design metrics.

Figure 9A:
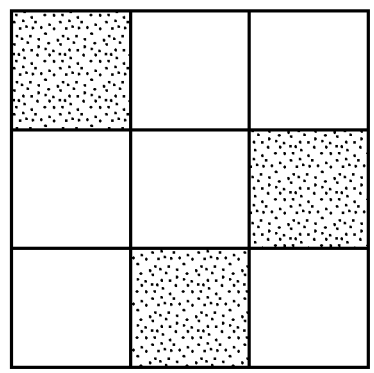
FIGS. 9A-9C are diagrams of illustrative keep-out zones that can be generated to help group multiple dies into one or more bins in accordance with an embodiment.
Figure 9B:
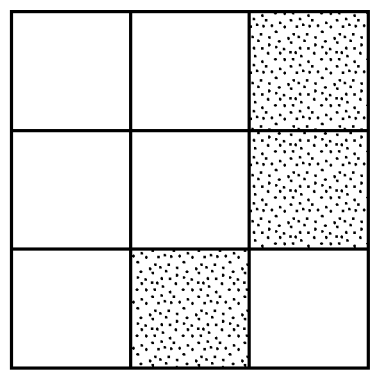
Figure 9C:
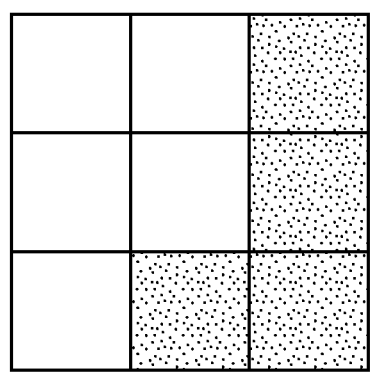

At step 712, the IC design tool may create larger keep-out zones around the actual defective resources for a group of dies with similar defects to help bin dies having defects in similar regions. This helps in minimizing the number of bins and unique keep-out regions. FIGS. 9A-9C are diagrams of illustrative keep-out zones that can be generated to help group multiple dies into one or more bins. As shown in FIG. 9A, the shaded keep-out zones cover both the defects in maps 800-A and 800-B, so the larger keep-out zones of FIG. 9A might help bin together devices A and B. As shown in FIG. 9B, the shaded keep-out zones cover both the defects in maps 800-B and 800-C, so the larger keep-out zones of FIG. 9B might help bin together devices B and C. FIG. 9C shows yet another set of keep-out zones, which is even larger than those of FIG. 9B, which can be used to help bin together devices B and C. In general, having more uniform shapes for keep-out regions helps improve the predictability of results generated by the IC design tool. A "uniform" shape is one that reduces non-accessible or difficult to access non-defective white spaces in the convex hull of the shape boundary. In general, the size of these uniform keep-out regions should also be minimized. This technique of creating larger keep-out zones that are supersets of two or more individual defect maps can help maximize the overlap of defect regions between different dies, thereby controlling the total number of possible bins and/or minimizing the number of parts with unique keep-out regions that the CAD tool has to deal with.

The IC design tool may produce one or more design metric while conducting learning experiments on the dies using the larger keep-out zones. The design tool may optionally compute a composite metric (or composite score) for each experiment, where the composite metric is a function of a logic utilization metric, a circuit performance metric, a power consumption metric, a routability metric, and/or compile time. As described above, each of the various design metrics included in the composite score may be assigned the same or different weighting factor.

Figure 10:
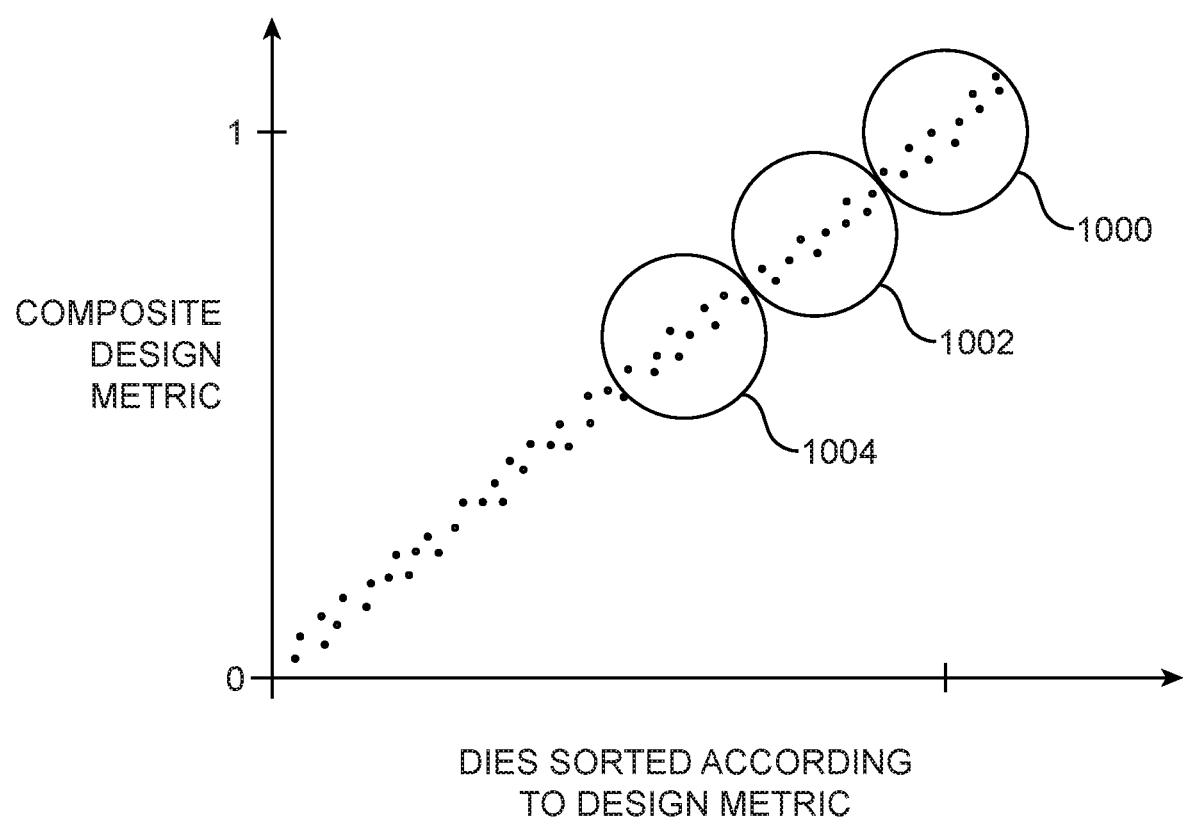
FIG. 10 is a diagram showing how a group of integrated circuit dies can be binned based on a composite design metric in accordance with an embodiment.

At step 714, the dies can be binned into different marketing SKUs based on the design metrics (e.g., the manufactured parts can be binned based on a composite score). FIG. 10 is a diagram showing how a batch of integrated circuit dies can be binned based on a composite design metric. The total number of parts to be binned may be at least 50 IC dies, at least 100 IC dies, at least 200 IC dies, at least 300 IC dies, more than 1000 IC dies, etc.

After all the dies have been tested via the steps of FIG. 7, the dies may be sorted according to the composite design metric. In the example of FIG. 10, the composite design metric is a normalized score value between zero and one. This is merely illustrative. The composite design metric/score can have any suitable numeric value. As shown in FIG. 10, the dies in cluster 1000 may be grouped into a first bin; the dies in cluster 1002 may be grouped into a second bin; the dies in cluster 1004 may be grouped in a third bin; and so on.

The dies in the first bin corresponding to the highest composite scores (e.g., dies that are either fully functional or have few silicon defects) may be used to create a first tier SKU having high logic utilization, high performance, high routability, etc. The dies in the second bin corresponding to the second highest composite scores may be used to create a second tier SKU having relatively lower logic utilization, performance, routability, etc. compared to the first tier SKU. The dies in the third bin corresponding to the third highest composite scores may be used to create a third tier SKU having even lower logic utilization, performance, routability, etc. compared to the second tier SKU. In general, the dies can be clustered into any suitable number of bins to create any desired number of SKUs. Offering lower-tier SKUs will enable chipmakers to sell most of the printed dies that would otherwise have been scrapped due to one or more irreparable silicon defects. In other words, the different SKUs created in this way can be sold to customers with various needs to help maximize revenue.

Dies that are binned as part of the same SKU can exhibit the same or different keep-out zones. For example, a first die in the second tier SKU may have first keep-out zones, whereas a second die in the second tier SKU may have second keep-out zones different than the first keep-out zones. When a customer implements a user logic design on these dies using tools 420, tools 420 may automatically avoid the first keep-out zones when fitting the user logic design on the first die or avoid the second keep-out zones when fitting the user logic design on the second die.

Figure 11:
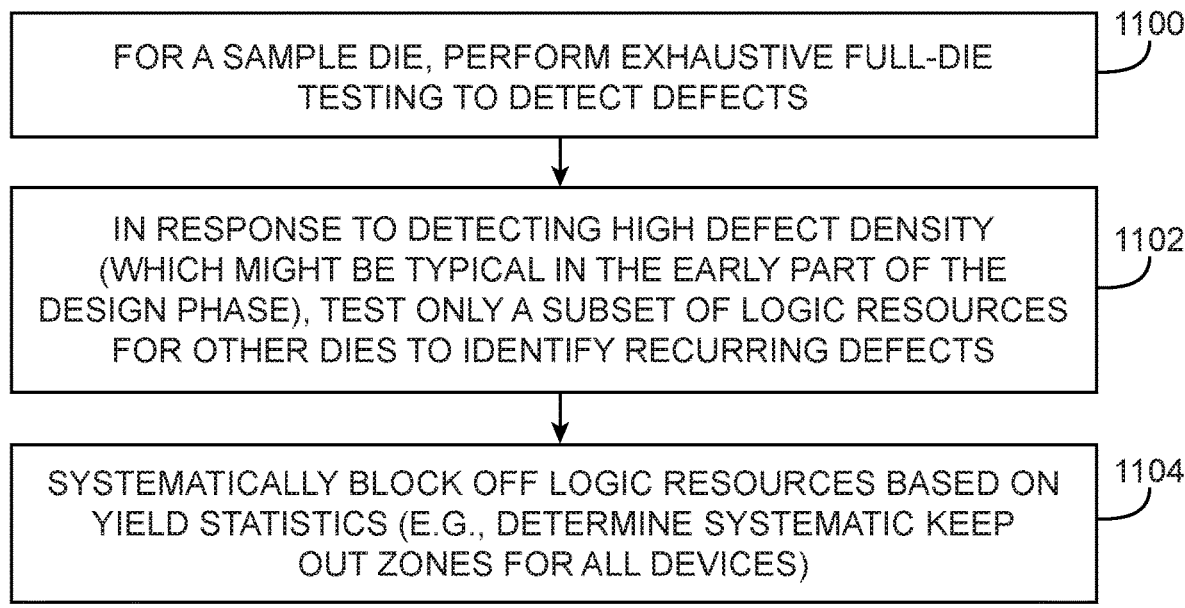
FIG. 11 is a flow chart of illustrative steps for systematically blocking off logic resources based on yield statistics for integrated circuit dies with high defect density in accordance with an embodiment.

In general, the binning method described above can be used to create multi-tiered SKUs at all stages of the process ramp phase to help realize more revenue. In the very early stages of the process ramp phase (e.g., at initial power-on), the dies will typically exhibit very high defect density and random defects. In such cases, it might be more efficient to systematically block off logic resources based on yield statistics (see, e.g., the flow chart of FIG. 11).

At step 1100, a sample IC die can be exhaustively tested to detect defects (e.g., using test equipment 200 to perform full-die fault analysis, fault isolation, etc.). In response to detecting high defect density (in early parts of the production phase on a new technology node as described above), test equipment 200 may be used to test only a subset of logic resources for the other remaining dies to identify any recurring or systematic defects (step 1102). As an example, only 20% of the routing multiplexers might be tested across each die to determine whether a portion of routing multiplexers in each logic region should be systematically restricted. This strategy will improve the time-to-market early parts on a new technology node.

At step 1104, the IC design tool may systematically block off logic resources based on yield statistics (e.g., based on results obtained from step 1102). If desired, a single mask file designating one keep-out zone pattern can be used for all manufactured parts early on in the process ramp phase, so no binning in needed.

Figure 12A:
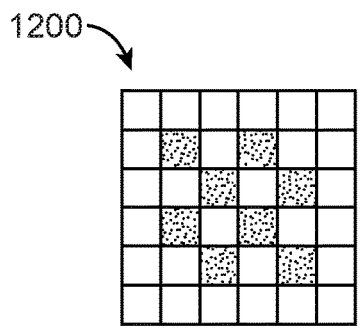
FIGS. 12A-12D are diagrams showing different arrangements for partially blocking off logic resources on an integrated circuit die in accordance with an embodiment.
Figure 12B:
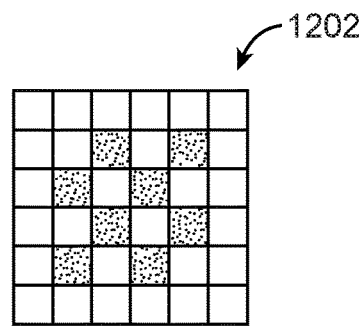

FIGS. 12A-12D are diagrams showing different arrangements for partially blocking off logic resources. FIG. 12A illustrates a first keep-out zone pattern 1200 for systematically blocking off a first set of logic regions. The logic regions being blocked off can have any suitable level of granularity (e.g., the logic resources can be restricted at the logic sector level, at the logic array block level, at the adaptive logic module level, etc.). FIG. 12B illustrates a second keep-out zone pattern 1202 for systematically blocking off a second set of logic regions different than the first set.

Figure 12C:
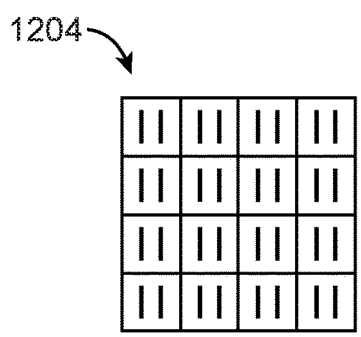
Figure 12D:
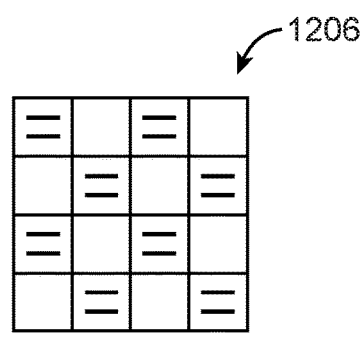

FIG. 12C shows a third illustrative keep-out zone pattern 1204 that systematically blocks off only a portion of logic resources in each logic region. For example, pattern 1204 may specify that two sets of routing multiplexers be restricted in each logic region, as indicated by the two shaded areas in each logic region. FIG. 12D shows a fourth keep-out zone pattern 1206 that systemically blocks off only a portion of logic resources in a subset of logic regions. For example, pattern 1206 may specify that two sets of flip-flops or registers be restricted in every other logic region, as indicated by the two shaded areas in the affected logic regions.

At the other extreme, if most of the manufactured dies have no defects or if each die has a very small number of defects (e.g., less than 10 defective components), then every defective die can just use its own defect map as its keep-out zone. Since there are not many defective dies, no binning is necessary.

The embodiments thus far have been described with respect to integrated circuits. The methods and apparatuses described herein may be incorporated into any suitable circuit. For example, they may be incorporated into numerous types of devices such as programmable logic devices, application specific standard products (ASSPs), and application specific integrated circuits (ASICs), microcontrollers, microprocessors, central processing units (CPUs), graphics processing units (GPUs), etc. Examples of programmable logic devices include programmable arrays logic (PALs), programmable logic arrays (PLAs), field programmable logic arrays (FPGAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The programmable logic device described in one or more embodiments herein may be part of a data processing system that includes one or more of the following components: a processor; memory; IO circuitry; and peripheral devices. The data processing can be used in a wide variety of applications, such as computer networking, data networking, instrumentation, video processing, digital signal processing, or any suitable other application where the advantage of using programmable or re-programmable logic is desirable. The programmable logic device can be used to perform a variety of different logic functions. For example, the programmable logic device can be configured as a processor or controller that works in cooperation with a system processor. The programmable logic device may also be used as an arbiter for arbitrating access to a shared resource in the data processing system. In yet another example, the programmable logic device can be configured as an interface between a processor and one of the other components in the system.

Although the methods of operations were described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

EXAMPLES

The following examples pertain to further embodiments.

Example 1 is a method for manufacturing a plurality of integrated circuit dies, the method comprising: with test equipment, testing the plurality of integrated circuit dies to identify defects on the plurality of integrated circuit dies; in response to identifying the defects on the plurality of integrated circuit dies, creating defect maps for the plurality of integrated circuit dies; and binning the plurality of integrated circuit dies into different tiers based on the defect maps.

Example 2 is the method of example, wherein the defect maps optionally include information about the location of the defects on the plurality of integrated circuit dies.

Example 3 is the method of any one of examples 1-2, wherein the defect maps optionally include information about the type of the defects on the plurality of integrated circuit dies.

Example 4 is the method of any one of examples 1-3, wherein the defect maps optionally include information about one or more conditions causing the defects on the plurality of integrated circuit dies.

Example 5 is the method of any one of examples 1-4, optionally further comprising combining the defect maps to obtain an aggregate defect map.

Example 6 is the method of example 5, optionally further comprising: with integrated circuit design tools, receiving the aggregate defect map and creating first keep-out zones for the plurality of integrated circuit dies.

Example 7 is the method of example 6, optionally further comprising: with the integrated circuit design tools, creating second keep-out zones larger than the first keep-out zones, wherein the second keep-out zones cover defects associated with at least two different integrated circuit dies in the plurality of integrated circuit dies.

Example 8 is the method of example 7, optionally further comprising: performing experiments on the plurality of integrated circuit dies while respecting the second keep-out zones to compute corresponding design metrics, wherein the experiments are designed to increase the number of defective integrated circuit dies to be shipped while reducing the number of different tiers and reducing the number of unique keep-out zones in each of the different tiers.

Example 9 is the method of example 8, wherein the design metrics optionally include metrics selected from the group consisting of: logic utilization, circuit performance, power consumption, routing congestion, and compile time.

Example 10 is the method of example 9, wherein binning the plurality of integrated circuit dies into the different tiers optionally comprises binning the plurality of circuit dies based on a composite score that is a weighted function of one or more of the design metrics.

Example 11 is a method for operating integrated circuit design tools, the method comprising: receiving an aggregate defect map that includes information from defect maps associated with a plurality of integrated circuit dies; using the aggregate defect map to create keep-out zones for the plurality of integrated circuit dies; running experiments on the plurality of integrated circuit dies while respecting the keep-out zones; and grouping the plurality of integrated circuits into different bins based on results from the experiments.

Example 12 is the method of example 11, wherein the defect maps optionally include information about the location of defects, the type of defects, and defect-causing conditions for the plurality of integrated circuit dies.

Example 13 is the method of any one of examples 11-12, wherein running the experiments on the plurality of integrated circuit dies optionally comprises implementing a training circuit design on the plurality of integrated circuit dies without using logic resources in the keep-out zones, and wherein the experiments are optionally designed to increase the number of defective integrated circuit dies to be sold while reducing the number of different bins and reducing the number of unique keep-out zones in each of the different bins.

Example 14 is the method of any one of examples 11-13, wherein the keep-out zones associated with a given integrated circuit die in the plurality of integrated circuit dies optionally cover defects from at least two different integrated circuit dies in the plurality of integrated circuit dies.

Example 15 is the method of any one of examples 11-14, wherein running the experiments on the plurality of integrated circuit dies optionally comprises: running the experiments to generate corresponding design metrics; and computing composite scores for the plurality of integrated circuit dies using the generated design metrics, wherein grouping the plurality of integrated circuits into the different bins comprises sorting the plurality of integrated circuits according to their respective composite scores and clustering together integrated circuit dies with similar composite scores.

Example 16 is a method for using integrated circuit design tools to implement an integrated circuit, the method comprising: compiling a source code to generate a corresponding hardware description; and generating a circuit layout for the integrated circuit based on the hardware description while automatically avoiding predetermined keep-out zones on the integrated circuit, wherein the integrated circuit includes at least some irreparable defects within the predetermined keep-out zones.

Example 17 is the method of example 16, wherein generating the circuit layout for the integrated circuit optionally comprises: performing place and route operations without using any logic resources within the predetermined keep-out zones.

Example 18 is the method of any one of examples 16-17, wherein the predetermined keep-out zones optionally block off a subset of logic regions on the integrated circuit based on yield statistics.

Example 19 is the method of any one of examples 16-18, wherein the predetermined keep-out zones optionally block off only a portion of logic resources in each logic region on the integrated circuit based on yield statistics.

Example 20 is the method of any one of examples 16-19, wherein the predetermined keep-out zones optionally block off only a portion of logic resources in a subset of logic regions on the integrated circuit based on yield statistics.

The foregoing is merely illustrative of the principles of this invention and various modifications can be made by those skilled in the art. The foregoing embodiments may be implemented individually or in any combination.

What is claimed is:

1. A method for manufacturing a plurality of integrated circuit dies, the method comprising:
   with test equipment, testing the plurality of integrated circuit dies to identify defects on the plurality of integrated circuit dies;
   in response to identifying the defects on the plurality of integrated circuit dies, creating defect maps for the plurality of integrated circuit dies;
   binning the plurality of integrated circuit dies into a number of different tiers based on the defect maps;
   creating first keep-out zones for the plurality of integrated circuit dies based on the defect maps; and
   performing experiments on the plurality of integrated circuit dies while respecting the first keep-out zones to compute corresponding design metrics, wherein the experiments are designed to increase a number of defective integrated circuit dies to be shipped while reducing the number of different tiers and reducing a number of unique ones of the first keep-out zones in each of the different tiers.

2. The method of claim 1, wherein the defect maps include information about the location of the defects on the plurality of integrated circuit dies.

3. The method of claim 1, wherein the defect maps include information about the type of the defects on the plurality of integrated circuit dies.

4. The method of claim 1, wherein the defect maps include information about one or more conditions causing the defects on the plurality of integrated circuit dies.

5. The method of claim 1, further comprising:
   combining the defect maps to obtain an aggregate defect map.

6. The method of claim 5, further comprising:
   with integrated circuit design tools, receiving the aggregate defect map and creating the first keep-out zones for the plurality of integrated circuit dies based on the aggregate defect map.

7. The method of claim 6, further comprising:
   with the integrated circuit design tools, creating second keep-out zones larger than the first keep-out zones, wherein the second keep-out zones cover defects associated with at least two different integrated circuit dies in the plurality of integrated circuit dies.

8. The method of claim 7, further comprising:
   performing additional experiments on the plurality of integrated circuit dies while respecting the second keep-out zones to compute corresponding additional design metrics.

9. The method of claim 1, wherein the design metrics include metrics selected from the group consisting of:
   logic utilization, circuit performance, power consumption, routing congestion, and compile time.

10. The method of claim 9, wherein binning the plurality of integrated circuit dies into the different tiers comprises binning the plurality of integrated circuit dies based on a composite score that is a weighted function of one or more of the design metrics.

11. A method for operating integrated circuit design tools, the method comprising:
    receiving an aggregate defect map that includes information from defect maps associated with a plurality of integrated circuit dies;
    using the aggregate defect map to create keep-out zones for the plurality of integrated circuit dies;
    running experiments on the plurality of integrated circuit dies while respecting the keep-out zones; and
    grouping the plurality of integrated circuit dies into different bins based on results from the experiments, wherein running the experiments on the plurality of integrated circuit dies comprises implementing a training circuit design on the plurality of integrated circuit dies without using logic resources in the keep-out zones, and wherein the experiments are designed to increase a number of defective integrated circuit dies to be sold while reducing a number of the different bins and reducing a number of unique ones of the keep-out zones in each of the different bins.

12. The method of claim 11, wherein the defect maps include information about the location of defects, the type of defects, and defect-causing conditions for the plurality of integrated circuit dies.

13. The method of claim 11 further comprising:

with the integrated circuit design tools, creating additional keep-out zones larger than the keep-out zones, wherein the additional keep-out zones cover defects associated with at least two different integrated circuit dies in the plurality of integrated circuit dies.

14. The method of claim 11, wherein the keep-out zones associated with a given integrated circuit die in the plurality of integrated circuit dies cover defects from at least two different integrated circuit dies in the plurality of integrated circuit dies.

15. The method of claim 11, wherein running the experiments on the plurality of integrated circuit dies comprises:

running the experiments to generate corresponding design metrics; and computing composite scores for the plurality of integrated circuit dies using the generated design metrics, wherein grouping the plurality of integrated circuit dies into the different bins comprises sorting the plurality of integrated circuit dies according to their respective ones of the composite scores and clustering together integrated circuit dies with similar ones of the composite scores.

16. A method for using integrated circuit design tools to implement an integrated circuit, the method comprising:

compiling a source code to generate a corresponding hardware description; and generating a circuit layout for the integrated circuit based on the hardware description while automatically avoiding predetermined keep-out zones on the integrated circuit, wherein the integrated circuit includes at least some irreparable defects within the predetermined keep-out zones, wherein the predetermined keep-out zones on the integrated circuit cover defects from at least two different integrated circuit dies in a plurality of integrated circuit dies.

17. The method of claim 16, wherein generating the circuit layout for the integrated circuit comprises:

performing place and route operations without using any logic resources within the predetermined keep-out zones.

18. The method of claim 16, wherein the predetermined keep-out zones systematically block off a subset of logic regions on the integrated circuit based on yield statistics.

19. The method of claim 16, wherein the predetermined keep-out zones systematically block off only a portion of logic resources in each logic region on the integrated circuit based on yield statistics.

20. The method of claim 16, wherein the predetermined keep-out zones systematically block off only a portion of logic resources in a subset of logic regions on the integrated circuit based on yield statistics.

* * * * *